June 21, 1938.  L. E. TURNER  2,121,272
METHOD OF PRODUCING SOUND REPRODUCING NEEDLES
Filed Jan. 28, 1935
Inventor:
Louis E. Turner
by Fred Gerlach
his Atty Patented June 21, 1938

2,121,272

UNITED STATES PATENT OFFICE 2,121,272

METHOD OF PRODUCING SOUND REPRODUCING NEEDLES

Louis E. Turner, Chicago, Ill.

Application January 28, 1935, Serial No. 3,709

1 Claim. (Cl. 29—169.5)

The invention relates to the production of needles for reproducing sound.

It has heretofore been common to unite a tip of hard wear-resisting alloy, such as iridium, osmiridium or carboloy to a cylindrical shank of softer metal, such as brass or bronze, by means of an electric or acetylene weld but, on account of the lack of rigidity in the shank, the sound reproduction was not as efficient as desired. In some instances the tip and a portion of the shank above the tip or a portion of the shank above the portion fused to the tip have been flattened or made elliptical, to provide a limited amount of flexing in the shank in one direction and stiffening in the transverse direction. In the latter type, it is necessary to set the needle so that its flattened portion has a definite relation to the direction of the grooves in the records because if the needle was not properly set it would injure the record and would not efficiently reproduce sound.

The object of the present invention is to provide a simple method of producing needle which comprises a round shank of soft metal and a fused wear-resisting tip and possesses the desired rigidity for efficient and accurate reproduction and does not require definite positioning with respect to the grooves in the record being produced.

This object is accomplished primarily by fusing a tip of wear-resisting metal to a shank of softer metal and tempering the shank, and more particularly that portion which is contiguous to the upper end of the tip, to give it the desired rigidity for correct reproduction of sound, without requiring definite positioning of the needle relatively to the grooves in the record being reproduced. In practice, it has been found that a shank which is tempered after the tip has been fused thereto will achieve this result.

The invention consists in the several novel features hereinafter set forth and more particularly defined by claim at the conclusion hereof.

The drawing illustrates a needle embodying the invention.

The invention is exemplified in a needle comprising a shank with a cylindrical body portion 1 and a tapered or conoidal end portion 2, and a conoidal record-engaging tip 3 formed of hard metal, such as carboloy, iridium, or osmiridium. The shank is formed of suitable metal, such as bronze, brass, or steel. The tip is fused to the end of the tapered portion 2 of the shank. The shank is tempered.

In manufacturing the needle the tip of wear-resisting metal is first fused to the shank of softer metal by an electric or gas weld. During this fusing the soft metal in the shank loses its temper. Next, the tip and tapered end of the shank are ground on lathes, laps or fine stones to the desired angle necessary to fit the record grooves perfectly. Next, the point of the tip is rounded off to secure the necessary radius by means of tumbling in a suitable tumbler or with a mixture of shot and abrasives or by means of abrasive paper or cloth applied against the spinning tip held in a lathe or similar tool. Next, the temper of the shank, and particularly the tapered end portion contiguous to the tip which has been destroyed in the process of welding, is restored by means of hammering or rolling or stamping in a press or squeezing in a screw vice, so that the metal of the shank or said contiguous portion will be tempered or densified to provide the desired rigidity.

By retempering the tip portion of the shank, weakness in the common or simple round type of needle, which causes its failure, is overcome.

It is not necessary to flatten the shank above the tip to give it flexibility in one direction and rigidity in a transverse direction, but it will be understood that a portion of the shank above the tip portion may be somewhat flattened or elliptical, but when the shank is retempered, as set forth, the rigidity of the tip portion of the shank is not maintained, so that it is not necessary to set the needle in any definite relation to the grooves in the record, and the needle will be properly operative for reproduction in any rotative position.

The invention is not to be understood as restricted to the details set forth, since these may be modified within the scope of the appended claim, without departing from the spirit and scope of the invention.

Having thus described the invention, what I claim as new and desire to secure by Letters Patent is:

That improvement in producing a needle for reproducing sound which consists in fusing a tip of comparatively hard wear-resisting metal to a shank of softer metal and then retempering the entire shank after the tip has been fused thereto.

LOUIS E. TURNER.